United States Patent
Hamada et al.

(10) Patent No.: US 6,218,466 B1
(45) Date of Patent: Apr. 17, 2001

(54) METHOD FOR THE CONTINUOUS PREPARATION OF LIQUID SILICONE RUBBER BASE

(75) Inventors: Mitsuo Hamada; Koich Ishida; Atsushi Komatsu; Hidetoshi Kurusu; Hideyuki Mori; Toyohiko Yamadera, all of Chiba Prefecture (JP)

(73) Assignee: Dow Corning Toray Silicone Co. Ltd., Tokyo (JP)

( * ) Notice: Subject to any disclaimer, the term of this patent is extended or adjusted under 35 U.S.C. 154(b) by 0 days.

(21) Appl. No.: 09/383,433

(22) Filed: Aug. 27, 1999

Related U.S. Application Data

(63) Continuation of application No. 08/941,429, filed on Sep. 30, 1997, now abandoned.

(30) Foreign Application Priority Data

Sep. 30, 1996 (JP) .................................................. 8-280362
Jun. 9, 1997 (JP) .................................................. 9-166610

(51) Int. Cl.$^7$ ............................... C08K 3/36; C08K 3/08; C08K 3/04
(52) U.S. Cl. ....................... 524/862; 523/324; 366/181.4; 366/178.1; 366/309; 366/315; 524/588; 524/860
(58) Field of Search .............................. 366/181.4, 178.1, 366/309, 315; 524/862, 588, 860; 523/324

(56) References Cited

U.S. PATENT DOCUMENTS

| | | | |
|---|---|---|---|
| 4,946,893 | * | 8/1990 | Saito et al. ............................ 524/862 |
| 5,352,724 | * | 10/1994 | Fujiki et al. ......................... 524/398 |
| 5,599,102 | * | 2/1997 | Hamada et al. .................. 366/178.1 |
| 6,019,498 | * | 2/2000 | Hamada et al. .................. 366/178.1 |

* cited by examiner

Primary Examiner—Margaret G. Moore
(74) Attorney, Agent, or Firm—William F. Boley; Jennifer S. Warren

(57) ABSTRACT

A method is provided that can very rapidly produce a liquid silicone rubber base in which even microfine electrically conductive filler with specific surface of at least 0.5 m$^2$/g will be homogeneously dispersed in liquid organopolysiloxane without small lump or clump formation.

The method for the continuous preparation of liquid silicone rubber base, including the steps of
continuously supplying to a continuous mixing apparatus
  (A) 100 weight parts polyorganosiloxane that has a viscosity at 25° C. of 100 to 500,000 mPa·s comprising at least 2 silicon-bonded alkenyl groups in each molecule,
  (B) 0 to 200 weight parts electrically nonconductive inorganic filler, and
  (C) 0.1 to 700 weight parts electrically conductive filler with a specific surface of at least 0.5 m$^2$/g
    wherein the combined quantity of components (B) and (C) is from 5 to 700 weight parts
    where the continuous mixing apparatus has a cylindrical body casing with a material feed opening at the top of the body casing, a mixture discharge outlet at the bottom of the body casing, and a rotating disk within the casing such that the ratio of the diameter of the rotating disk to the inside diameter of the cylindrical body casing is 0.80 to 0.95;
mixing components (A) through (C) therein by the rotation of the rotating disk to form a mixture; and
discharging the mixture through the said discharge outlet.

11 Claims, 1 Drawing Sheet

METHOD FOR THE CONTINUOUS PREPARATION OF LIQUID SILICONE RUBBER BASE

This application is a continuation of Ser. No. 08/941,429 filed Sep. 30, 1997, now abandoned.

BACKGROUND OF THE INVENTION

This invention relates to a method for the continuous preparation of liquid silicone rubber bases and in particular for the preparation of electrically conductive liquid silicone rubber bases.

Liquid silicone rubber compounds that cure by the hydrosilylation reaction to give colored or electrically conductive rubber are already well known. These compounds are in frequent use in the electrical, electronic, construction, and mechanical sectors. The electrically conductive liquid silicone rubber base that is the base ingredient of electrically conductive liquid silicone rubber compounds is often prepared by a batch method from a basic set of ingredients consisting of alkenyl-functional polyorganosiloxane, conductive filler, and optionally nonconductive inorganic filler.

In the batch scheme these precursors are introduced into a mixer such as a twin-blade kneader or dough mixer, a Henschel mixer, or planetary mixer and are mixed to homogeneity. A continuous production method is also available in which the precursors are continuously introduced into the twin-screw extruder described by Kobayashi, et al. in U.S. Pat. No. 4,649,005 and are continuously mixed and discharged. The batch production methodology suffers from such problems as a low productivity, high equipment costs, and poor ability to achieve the homogeneous dispersion of microfine conductive fillers such as carbon black. Moreover, achieving the homogeneous dispersion of a microfine conductive filler such as carbon black is difficult even with the preparative method using the twin-screw extruder.

Hamada, et al., in U.S. Pat. No. 5,599,102 disclose a continuous mixing apparatus for mixing a liquid with a powder, but does not disclose conditions by which a microfine conductive filler such as carbon black can be uniformly blended into a fluid silicone polymer.

Figure 1:
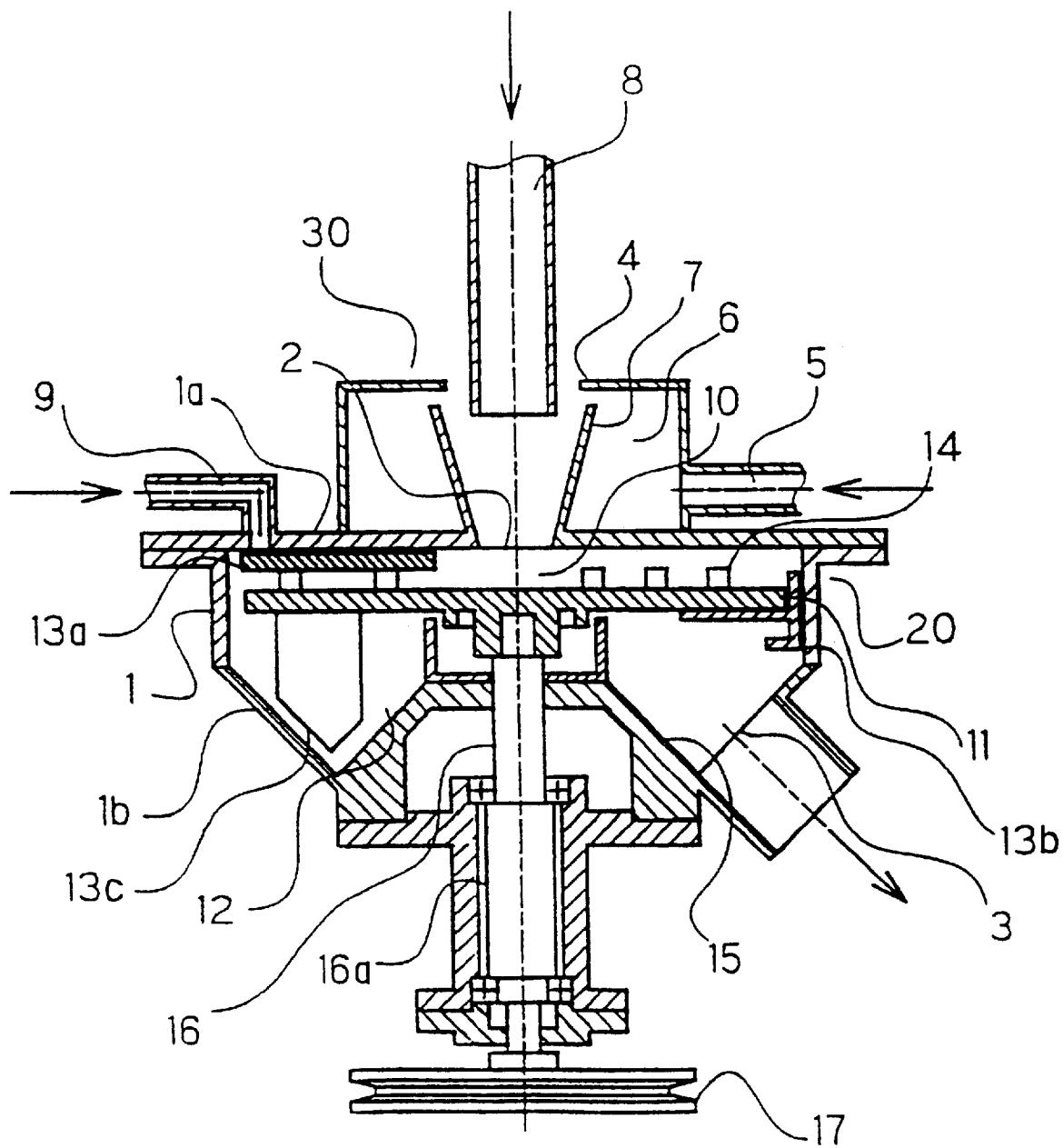
FIG. 1 contains a cross section of the continuous mixing device used in the working examples of the present invention.

| | |
|---|---|
| 1 | casing |
| 1a | upper plate |
| 1b | inclined surface |
| 2 | feed opening |
| 3 | discharge outlet |
| 4 | casing |
| 5 | liquid feed line |
| 6 | liquid reservoir |
| 7 | overflow tube |
| 8 | powder feed conduit |
| 9 | additive feed line |
| 10 | upper mixing compartment |
| 11 | rotating disk |
| 12 | lower mixing compartment |
| 13a, 13b, 13c | scrapers |
| 14 | mixing pin |
| 15 | conical element |
| 16 | rotating axle |
| 17 | pulley |
| 20 | mixer body |
| 30 | starting material feed section |

DETAILED DESCRIPTION OF THE INVENTION

The object of the present invention is to provide a highly productive method for preparing liquid silicone rubber bases that employs a simple apparatus and offers an excellent dispersing performance. This object is achieved by continuously supplying to a continuous mixing apparatus
(A) 100 weight parts polyorganosiloxane that has a viscosity at 25° C. of 100 to 500,000 mPa·s and has at least 2 silicon-bonded alkenyl groups in each molecule,
(B) 0 to 200 weight parts electrically nonconductive inorganic filler, and
(C) 0.1 to 700 weight parts electrically conductive filler with a specific surface area of at least 0.5 $m^2/g$
wherein the combined quantity of components (B) and (C) is 5 to 700 weight parts
where the continuous mixing apparatus that comprises a cylindrical body casing having a material feed opening at the top of the cylindrical body casing, a mixture discharge outlet at the bottom of the cylindrical body casing, and a rotating disk within the casing such that the ratio of the diameter of the rotating disk to the inside diameter of the cylindrical element of the casing is 0.80 to 0.95;
mixing components (A) through (C) therein by the rotation of the rotating disk to form a mixture; and
discharging the mixture through the discharge outlet.

The polyorganosiloxane (A) used in the present invention, which is the base ingredient of the liquid silicone rubber base, has at least 2 silicon-bonded alkenyl groups in each molecule in order for curing by the crosslinking reaction to occur. The alkenyl groups are exemplified by vinyl, allyl, or propenyl. The non-alkenyl organic groups in this component are exemplified by alkyl, including methyl, ethyl, and propyl; aryl, including phenyl and tolyl; and substituted alkyl including 3,3,3-trifluoropropyl and 3-chloropropyl. The molecular structure of this component may be either straight chain or branch-containing straight chain. This component preferably has a viscosity in the range from 100 to 500,000 mPa·s for the following reasons: obtaining good rubber properties becomes highly problematic at a viscosity below 100 mPa·s, while a viscosity in excess of 500,000 mPa·s result in a poor extrudability and poor fluidity by the liquid silicone rubber base made by the method of the present invention.

The electrically nonconductive inorganic filler used as component (B) by the present invention imparts consistency and body to the liquid silicone rubber base and mechanical strength to the cured product afforded by the liquid silicone rubber base. The subject inorganic filler is a fumed silica, or dry-process silica, precipitated silica or wet-process silica; a fumed or precipitated silica, after surface hydrophobicization with an organochlorosilane such as dimethyldichlorosilane or trimethylchlorosilane, or an organosiloxane oligomer such as octamethylcyclotetrasiloxane or silanol-endblocked dimethylsiloxane oligomer, or with hexamethyldisilazane; silica aerogel; calcium carbonate powder; magnesium carbonate powder; quartz powder; diatomaceous earth powder; and magnesium oxide powder. Reinforcing silicas with a specific surface of at least 50 m²/g are preferred because they result in a good dispersion quality for the conductive filler (C). Component (B) is admixed at from 0 to 200 weight parts, preferably from 1 to 150 weight parts, and more preferably from 5 to 60 weight parts, in each case per 100 weight parts component (A). The use of more than 200 weight parts component (B) causes the liquid silicone rubber base itself to have an excessively high viscosity.

The electrically conductive filler with specific surface of at least 0.5 m²/g used as component (C) in the present invention is employed to impart color or electrical conductivity to the liquid silicone rubber base. Component (C) is preferably conductive carbon black and is specifically exemplified by conductive furnace blacks (CF), superconductive furnace blacks (SCF), extraconductive furnace blacks (XCF), conductive channel blacks (CC), graphite powder, and furnace and channel blacks that have been heated to about 1,500° C. Metal micropowders are also preferred for component (C) and are exemplified by the micropowders of gold, silver, nickel, and so forth. Component (C) is admixed at from 0.1 to 700 weight parts per 100 weight parts component (A). The use of less than 0.1 weight part results in an inadequate conductivity, while the use of more than 700 weight parts causes the liquid silicone rubber base itself to have an excessively high viscosity and thus causes impaired handling characteristics. In addition, the combined amount of components (B) and (C) is from 5 to 700 weight parts for the following reasons: the post-cure mechanical strength is low at less than 5 weight parts; exceeding 700 weight parts causes an excessively high viscosity and thus causes impaired handling characteristics. When component (C) is conductive filler with a specific surface area greater than 10 m²/g such as carbon black, the preferred component (C) addition is from 0.1 to 50 weight parts. When Component (C) is a conductive filler with at least 10 m²/g, then the use of more than 50 weight parts causes the liquid silicone rubber base to have an excessively high viscosity and impaired handling characteristics. When, however, component (C) is conductive filler whose specific surface area is something clearly less than 10 m²/g such as metal micropowder, the preferred component (C) addition is from 100 to 700 weight parts. The following can also be added on an optional basis: plasticizers such as silanol-functional diorganosiloxane oligomer or hexaorganodisilazane, addition-reaction inhibitors, heat stabilizers, colorants, adhesion promoters, and nonreactive silicone oils.

The liquid silicone rubber base according to the present invention can be converted into silicone rubber by combining the base with polyorganohydrogensiloxane and platinum catalyst followed by curing by holding the mixture at room temperature for an extended period of time or by heating. The base can also be converted into silicone rubber by combining it with organoperoxide and heating to effect cure.

In the present invention, components (A) and (C) or components (A) to (C) are continuously supplied in their respectively specified quantities into a continuous mixing apparatus that is provided with a starting material feed opening at the top of a casing, a discharge outlet at the bottom of the casing, and a rotating disk within the casing and are therein mixed in their respectively specified quantities, preferably at 50° C. to 300° C. through the rotation of the said rotating disk. The continuous mixer depicted in FIG. 1 is preferably used for this operation.

In FIG. 1, (20) refers to the mixer body and (30) refers to the starting material feed section for the mixer. A cylindrical body casing (1) forms the outer shell of the mixer body (20), and a feed opening (2) that receives liquid/powder mixture is provided at the center of the upper plate (1a) of this body casing. The lower part of the body casing forms an inclined surface (1b) having the shape of an inverted cone, and discharge outlet (3) is installed in said inclined surface (1b). A conical element (15) is provided at the center of the bottom of the casing so as to form an annular V-shaped bottom with the inclined surface (1b).

A cylindrical feed section casing (4) forms the outer shell of the starting material feed section (30). A liquid feed line (5) is connected tangentially at the side of this feed section casing, and a liquid reservoir (6) is formed within the feed section casing. An overflow tube (7) having the shape of an inverted cone is connected on the top of the feed opening (2) on the mixer body (20). This overflow tube (7) ascends vertically into the liquid reservoir (6). The lower end of a powder feed conduit (8) faces the inlet to the overflow tube (7).

The polyorganosiloxane is fed into the starting material feed section (30) through the liquid feed line (5), while the fillers are fed from the powder feed conduit (8). The polyorganosiloxane supplied from the liquid feed line (5) is first stored in the liquid reservoir (6) and then flows down along the inner wall of the overflow tube (7) from its top edge. At this point the filler supplied through the powder feed conduit (8) is mixed into the polyorganosiloxane and descends into the feed opening (2).

A rotating disk (11) is installed horizontally within the cylindrical body casing (1) of the mixer body (20) so as to face the feed opening (2). This rotating disk (11) divides the interior of the casing into an upper mixing compartment (10), where a first-stage mixing operation is implemented, and a lower mixing compartment (12), where a second-stage mixing operation is implemented. The center of rotation of this rotating disk (11) is fixed on the upper end of a rotating axle (16). Said rotating axle (16) is supported by a bearing element (16a) and extends to the exterior of the casing (1). A pulley is fixed at the bottom end of the rotating axle (16), and the power for rotation is input from a motor, not shown across this pulley (17). The preferred range for the rotation rate is from 400 to 3,000 rpm based on considerations of the quality of the conductive filler dispersion. When the conductive filler is at least 10 m²/g the preferred range is 400 to 1,500 rpm. An additive feed line (9) is provided in the upper plate (1a), and this additive feed line (9) opens into the upper mixing compartment (10). The said additive feed line (9) is not required when no additive is to be admixed.

The upper surface, outside edge, and lower surface of the rotating disk (11) each carry three scrapers in sets (13a), (13b), (13c), the scrapers being separated by equal angles, and the mixture is mixed through both the stirring action of the rotating disk and the stirring and scraping actions of these scrapers. Mixing proceeds as follows: the scrapers (13a) in the upper mixing compartment (10) scrape off the mixture adhering to the upper plate (1a); the scrapers (13b) scrape off the mixture adhering on the inner wall of the casing at the boundary between the upper mixing compartment (10) and the lower mixing compartment (12); and the scrapers (13c) in the lower mixing compartment (12) scrape off the mixture adhering on the inclined surface (1b) of the casing bottom.

The ratio of the diameter of the rotating disk (11) to the inside diameter of the cylindrical element of the cylindrical body casing (1) is particularly important to the quality of the dispersion of component (C), and values from 0.8 to 0.95 and preferably from 0.85 to 0.9 are specified herein for this ratio. A ratio less than 0.8 will produce deficient dispersion due to a "short pass" by the powder; a ratio above 0.95 does produce dispersion, but does not permit transfer of the mixed stock into the lower mixing compartment (12).

The mixer need not have 3 scrapers in each set (13a), (13b), and (13c). One or more scraper in each set may be employed. Moreover, the scraper sets may all contain the same number of scrapers or may contain different numbers of scrapers, and the scrapers (13b) on the outer edge of the rotating disk (11) may even be omitted as desired. The upper surface of the rotating disk (11) may as necessary also bear a large number of vertical mixing pins (14), which through their stirring activity serve to further promote stirring and mixing. A conforming jacket may be provided for purposes of temperature control over the outer surface of the cylindrical body casing (1) of the mixer body (20).

In the above-described continuous mixing apparatus, the polyorganosiloxane/filler mixture entering the upper mixing compartment (10) from the feed opening (2) is subjected, while being radially transported outward on the rotating disk (11). to the first-stage mixing process based on stirring and scraping by the scrapers (13a) and mixing pins (14). The mixture that has been mixed in the first-stage mixing process is then subjected to the second-stage mixing process based on shear between the circumference of the rotating disk (11) and the interior wall of the cylindrical body casing (1) and stirring and scraping by the scrapers (13b).

The mixture that has been transported to the lower mixing compartment (12) then descends onto the inclined surface (1b) and is sheared while being scraped by the ends of the scrapers (13c). The resulting additional dispersion of the fillers induces a further lowering of the apparent viscosity of the mixture. The mixture is then discharged through the discharge outlet (3). Considerations of the quality of the dispersion make it preferable for the polyorganosiloxane/filler mixture in the lower mixing compartment (12) to reach a temperature from 30° C. to 300° C. When component (C) is a metal micropowder that has a melting point, this temperature is lower than the melting point. Even when the blending ratio for component (C) is below 5 weight parts, a uniform dispersion into component (A) can be induced without the formation of small lumps or clumps.

EXAMPLES

The invention will be explained in greater detail in the following through working examples. The values reported for the viscosity, electrical resistance, and rubber properties in the examples were measured at 25° C.

In order to measure the rubber properties, 100 weight parts of defoamed liquid silicone rubber base was combined with 2 weight parts polymethylhydrogensiloxane, with a viscosity of 7.0 mPa·s, and silicon-bonded hydrogen content of 0.75 weight percent, and a chloroplatinic acid-tetramethyldivinyldisiloxane complex at the rate of 15 ppm as platinum referred to the polyorganosiloxane. This was cured at 150° C. for 10 minutes, and the properties of the resulting rubber were measured by the methods described in JIS K 6301. The electrical resistance was measured by introducing the uncured composition between plate electrodes (1 mm).

The quality of the dispersion of the carbon black or metal micropowder was visually evaluated on a thin film of the carbon black- or metal micropowder-loaded liquid silicone rubber base spread on a transparent polyester film.

In order to measure the post-cure rubber properties and volume resistivity, the liquid silicone rubber base was defoamed. The following were thoroughly mixed into the defoamed base per 100 weight parts of the organopolysiloxane in the defoamed base: 2 weight parts polymethylhydrogensiloxane, with a viscosity a 7.0 mPa·s, and silicon-bonded hydrogen content of 0.75 weight percent, and chloroplatinic acid-tetramethyldivinyldisiloxane complex so as to provide 15 ppm platinum referred to the polyorganosiloxane. This was cured into a sheet by heating at 150° C. for 10 minutes, and the properties were measured by the methods described in JIS K 6301 and JIS C 2123.

EXAMPLE 1

35 weight parts wet-process silica with specific surface of 230 m²/g and 1.0 weight part acetylene black with specific surface of 60 m²/g were continuously fed from powder feed conduit (8) into the overflow tube (7) of a continuous mixer according to FIG. 1. The diameter of rotating disk (11) was 300 mm, and the ratio of the diameter of rotating disk (11) to the interior diameter of casing (1) was 0.90. At the same time, 100 weight parts vinyl-endblocked polydimethylsiloxane with vinyl content of 0.23 weight percent and viscosity of 4,000 mPa·s was continuously fed to liquid reservoir (6) from liquid feed line (5). These starting materials passed through feed opening (2), descended onto the rotating disk (11), and were mixed at 200° C. by the continuous rotation of the rotating disk (11) at 900 rpm. The mixture was continuously discharged to the outside through discharge outlet (3). The various properties of the resulting liquid silicone rubber base were measured and the results are reported in Table 1.

COMPARATIVE EXAMPLE 1

A liquid silicone rubber base was prepared similarly to Example 1, but using a continuous mixer in which the diameter of the rotating disk was 230 mm and the ratio of the diameter of the rotating disk (11) to the interior diameter of casing (1) was 0.70. The various properties of the resulting liquid silicone rubber base were measured and the results are reported in Table 1.

TABLE I

| | properties | |
|---|---|---|
| | Example 1 | Comparative Example 1 |
| pre-cure | | |
| appearance | black | black |
| quality of the carbon black dispersion | extremely good: small lumps were completely absent | poor: small lumps were present |
| apparent viscosity | 250 Pa · s | 248 Pa · s |
| post-cure | | |
| durometer | 41 | 41 |
| tensile strength (kgf/cm²) | 50 | 50 |
| elongation (%) | 365 | 360 |
| tear strength (kgf/cm) | 12 | 12 |

EXAMPLE 2

A mixture of 10 weight parts wet-process silica with specific surface of 230 m²/g, 12 weight parts acetylene black with specific surface of 60 m²/g, and 40 weight parts quartz powder of average particle size of 5 microns, was continuously fed from powder feed conduit (8) into the overflow tube (7) of a continuous mixer according to FIG. 1 where the diameter of rotating disk (11) was 300 mm, diameter of rotating disk (11) to the interior diameter of casing (1) was 0.90. At the same time, 100 weight parts vinyl-endblocked polydimethylsiloxane with vinyl content of 0.23 weight percent, and viscosity of 4,000 mPa·s, was continuously fed to liquid reservoir (6) from liquid feed line (5) and 3.0 weight parts hydroxyl-endblocked polydimethylsiloxane with viscosity of 50 mPa·s, was continuously fed into the upper mixing compartment (10) from additive feed line (9). Mixing was effected at 80° C. by the continuous rotation of the rotating disk (11) at 1,200 rpm. The mixture was continuously discharged to the outside through discharge outlet (3). The various properties of the resulting electrically conductive liquid silicone rubber base were measured and the results are reported in Table 2.

TABLE 2

|  | Properties |
| --- | --- |
| pre-cure |  |
| appearance | black |
| quality of the carbon black dispersion | extremely good: small lumps were completely absent |
| apparent viscosity | 40 Pa · s |
| electrical resistance (MΩ) | 0.05 |
| post-cure |  |
| specific gravity | 1.29 |
| durometer | 40 |

EXAMPLE 3

8 weight parts acetylene black with specific surface of 60 m²/g was continuously fed from the powder feed conduit (8) of a continuous mixer (1), as used in Example 1 at the same time that 100 weight parts vinyl-endblocked polydimethylsiloxane with vinyl content of 0.13 weight percent and a viscosity of 40,000 mPa·s, was continuously fed from liquid feed line (5). Mixing was effected at 250° C. by the continuous rotation of the rotating disk (1) at 900 rpm. The various properties of the resulting electrically conductive liquid silicone rubber base were measured and the results are reported in Table 3.

TABLE 3

|  | Properties |
| --- | --- |
| properties before curing |  |
| quality of the carbon black dispersion | good: there were no small lumps |
| apparent viscosity | 100 Pa · s |
| electrical resistance (MΩ) | 5,000 |
| post-cure properties |  |
| specific gravity | 1.00 |
| durometer | 10 |
| tensile strength (kgf/cm²) | 10 |
| elongation (%) | 500 |

EXAMPLE 4

550 weight parts silver powder with specific surface of 1.0 m²/g was continuously fed from the powder feed conduit (8) of a continuous mixer (1) as used in Example 1 at the same time that 100 weight parts vinyl-endblocked polydimethylsiloxane with vinyl content of 0.23 weight percent and viscosity of 4,000 mPa·s was continuously fed from liquid feed line (5). Mixing was effected at 40° C. by the continuous rotation of the rotating disk (11) at 900 rpm. The various properties of the resulting electrically conductive liquid silicone rubber base were measured and the results are reported in Table 4. The post-cure volume resistivity was measured by the four-point probe method.

COMPARATIVE EXAMPLE 2

100 weight parts vinyl-endblocked polydimethylsiloxane, with vinyl content of 0.23 weight percent and viscosity of 4,000 mPa·s, was placed in a planetary mixer with a rotation ratio of 1.0 to 1.5. 550 weight parts silver powder, with specific surface area of 1.0 m²/g, was then continuously fed into the mixer while mixing. Mixing was continued for an additional 30 minutes after this addition. The resulting mixture could not truly be considered a liquid silicone rubber base because the silver powder was present in the form of unmixed powder lumps. The various properties of this product were measured and the results are reported in Table 4.

TABLE 4

|  | properties | |
| --- | --- | --- |
|  | Example 4 | Comparative Example 2 |
| pre-cure |  |  |
| quality of the silver dispersion | good: aggregates were not present | poor: unmixed powder lumps were present |
| apparent viscosity | 30 Pa · s | could not be measured |
| post-cure |  |  |
| volume resistivity (Ω-cm) | 7 × 10⁻⁴ | could not be measured due to the impossibility of sheet fabrication |

The preparative method according to the present invention can very rapidly produce liquid silicone rubber base in which even microfine electrically conductive filler, with a specific surface of at least 0.5 m²/g, will be homogeneously dispersed in liquid organopolysiloxane without small lump or clump formation.

We claim:

1. A method for the continuous preparation of liquid silicone rubber base comprising:

continuously supplying solely to an upper mixing compartment of a continuous mixing apparatus (A) 100 weight parts polyorganosiloxane that has a viscosity at 25° C. of 100 to 500,000 mPa·s comprising at least 2 silicon-bonded alkenyl groups in each molecule, (B) 0 to 200 weight parts electrically nonconductive inorganic filler, and (C) 0.1 to 700 weight parts electrically conductive filler with a specific surface area of at least 0.5 m²/g, wherein the combined quantity of components (B) and (C) is from 5 to 700 weight parts thereby forming a mixture, where the continuous mixing apparatus comprises a cylindrical body casing having a starting material feed opening only at the top of the cylindrical body casing, a mixture discharge outlet at the bottom of the cylindrical body casing, a rotating disk positioned within the casing dividing the cylindrical body casing into the upper mixing compartment and a lower mixing compartment where the rotating disk has at least one scraper extending therefrom into the lower mixing compartment and adapted for scraping the interior wall of the cylindrical body casing forming the lower mixing compartment and the ratio of the diameter of the rotating disk to the inside diameter of the casing is 0.80 to 0.95 thereby creating a flow space between the circumference of the rotating disk and the interior wall of the cylindrical body casing for the mixture, where the internal wall of the cylindrical body casing forming the lower mixing compartment provides an unobstructed flow for the mixture from the upper mixing compartment and where rotation of the rotating disk provides mixing in the upper mixing compartment and further mixing of the mixture as it flows through the flow space formed between the circumference of the rotating disk and the interior wall of the cylindrical body casing and by action of the scraper extending therefrom into the lower mixing compartment; and discharging the mixture through the discharge outlet.

2. The method of claim 1 in which the polyorganosiloxane is polydiorganosiloxane, component (B) is reinforcing silica, and component (C) is carbon black.

3. The method of claim 1 where 1 to 150 weight parts component (B) to 100 parts component (A) are continuously supplied to the continuous mixing apparatus.

4. The method of claim 1 where 5 to 60 weight parts component (B) to 100 parts component (A) are continuously supplied to the continuous mixing apparatus.

5. The method of claim 1 where component (C) has a specific surface area of at least 10 $m^2/g$ and is continuously supplied at 0.1 to 50 weight parts per 100 weight parts component (A) to the continuous mixing apparatus.

6. The method of claim 1 where component (C) is a metal micropowder and is supplied at 100 to 700 weight parts per 100 weight parts component (A).

7. The method of claim 1 where components (A) through (C) are mixed at a temperature of 30° C. to 300° C.

8. The method of claim 1 where component (C) is a metal micropowder and components (A) through (C) are mixed below the melting point of the metal micropowder.

9. The method of claim 1 where the rotating disk rotates at a speed between 400 rpm and 3000 rpm.

10. The method of claim 1 where component (C) has a surface are of at least 10 $m^2/g$ and the rotating disk rotates at a speed of 400 rpm to 1500 rpm.

11. The method of claim 1 where the ratio of the diameter of the rotating disk to the inside diameter of the cylindrical body casing is 0.85 to 0.9.

* * * * *